US010499227B2

(12) United States Patent
Swanson et al.

(10) Patent No.: US 10,499,227 B2
(45) Date of Patent: Dec. 3, 2019

(54) DETERMINING SERVICE PROVIDER PERFORMANCE WITH RANGED TRANSMISSIONS

(71) Applicant: Uber Technologies, Inc., San Francisco, CA (US)

(72) Inventors: Katherine Swanson, New York, NY (US); Zachary Tyler Stewart, New York, NY (US); Erick Chang, Fresh Meadows, NY (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/155,124

(22) Filed: Oct. 9, 2018

(65) Prior Publication Data

US 2019/0053026 A1 Feb. 14, 2019

Related U.S. Application Data

(63) Continuation of application No. 15/451,221, filed on Mar. 6, 2017, now Pat. No. 10,136,288.

(Continued)

(51) Int. Cl.
*H04B 7/00* (2006.01)
*H04W 4/80* (2018.01)
*H04W 64/00* (2009.01)

(52) U.S. Cl.
CPC ........... *H04W 4/80* (2018.02); *H04W 64/006* (2013.01)

(58) Field of Classification Search
CPC ............................. H04W 4/80; H04W 64/006

(Continued)

(56) References Cited

U.S. PATENT DOCUMENTS

2014/0062695 A1* 3/2014 Rosen .................... G08B 21/18
340/539.13
2015/0278867 A1* 10/2015 Lerman .............. G06Q 30/0261
705/14.58

(Continued)

FOREIGN PATENT DOCUMENTS

WO WO 2016/160079 A1 10/2016

OTHER PUBLICATIONS

PCT International Search Report, PCT Application No. PCT/IB2017/055468, dated Jan. 29, 2018, 16 pages.

(Continued)

*Primary Examiner* — April G Gonzales
(74) *Attorney, Agent, or Firm* — Fenwick & West LLP

(57) ABSTRACT

A network system receives an order request from a requesting device including a list of requested items and a delivery location. The network system may create an order entry by selecting a source location and a provider for the order. The network system sends order information from the order entry to a provider device of the selected provider and a source device corresponding to the source location, where the order information includes an order identifier, a source identifier, and a provider identifier. The provider device broadcasts a beacon including the source identifier and the order identifier. The provider device detects a short range beacon signal from the source device and determines whether the detected source identifier and order identifier match the received source identifier and order identifier from the order information. Responsive to a successful match the provider device verifies its proximity to the source device.

20 Claims, 7 Drawing Sheets

Related U.S. Application Data

(60) Provisional application No. 62/408,931, filed on Oct. 17, 2016.

(58) Field of Classification Search
USPC .......................................................... 455/41.2
See application file for complete search history.

(56) References Cited

U.S. PATENT DOCUMENTS

| | | | | |
|---|---|---|---|---|
| 2016/0048796 A1* | 2/2016 | Todasco | ............... | G06Q 10/083 705/330 |
| 2016/0253624 A1* | 9/2016 | Sims | .................... | G06Q 10/083 705/333 |
| 2016/0260301 A1* | 9/2016 | Miller | ................ | G08B 13/2417 |
| 2016/0286587 A1* | 9/2016 | strand | ................... | H04W 76/14 |
| 2016/0292635 A1* | 10/2016 | Todasco | ............. | G06Q 10/0833 |
| 2016/0299213 A1* | 10/2016 | Jones | ........................ | G01S 5/08 |
| 2017/0041886 A1* | 2/2017 | Baker | ................... | H04W 76/14 |
| 2017/0208091 A1* | 7/2017 | Whitsell | ............. | H04L 63/1483 |

OTHER PUBLICATIONS

United States Office Action, U.S. Appl. No. 15/451,221, dated Apr. 4, 2018, nine pages.

\* cited by examiner

DETERMINING SERVICE PROVIDER PERFORMANCE WITH RANGED TRANSMISSIONS

CROSS-REFERENCE TO RELATED APPLICATIONS

This application is a continuation of U.S. application Ser. No. 15/451,221, filed Mar. 6, 2017, which claims the benefit of U.S. Provisional Application 62/408,931, filed on Oct. 17, 2016, and which is incorporated by reference here.

BACKGROUND

The described embodiments relate generally to determining service provider or courier behavior, and more particularly to using short-range transmissions between wireless devices associated with a courier or service provider.

Couriers retrieve and deliver items from a source to a destination. As large courier management systems allow a much greater number of orders and on-demand courier services, often from novice couriers, courier management systems may need to determine and verify when a courier for an order has reached the source of the item to complete pick up of the item. Couriers at the source point may report the pickup to the courier management system, but this can be unreliable.

SUMMARY

A network system (e.g., a courier or delivery management system) coordinates the delivery of requested items from a source location to a delivery location. A requesting user of the courier management system, such as a customer placing an order for a product or merchandise to be delivered, may submit an order request by providing input on a requesting device. The requesting user selects one or more items to request of a plurality of items presented by the courier management system and may optionally input a delivery location. The courier management system is configured to receive order requests from a requesting device. The request includes an identifier associated with an item provider of the requested item(s), a list of identifiers/tags associated with the requested item(s), and/or a delivery location for the requested items. The courier management system creates an order entry by selecting a source location that can provide the requested items (e.g., based on the identifier associated with the item provider) and selecting a service provider (e.g., a courier, a driver) that can retrieve the requested items from the source location and deliver the requested items to the delivery location. The order entry includes identifiers (IDs) corresponding to devices, individuals, or entities associated with the selected source location and/or the selected courier.

An example of a courier management system is a food delivery system that coordinates drivers to deliver food from third party restaurants to requesting users. In this example system, a requesting user, Bob, might order a pizza from Joe's Pizza Palace using his smartphone, the requesting device. In this example, the food delivery system would transmit data to a source device associated with and located at Joe's Pizza Palace to notify Joe's Pizza Palace to begin preparing the requested pizza. The food delivery system can select a driver that is located in the vicinity of Joe's Pizza Palace (e.g., having a current location within a predetermined distance of the location of Joe's Pizza Palace) to pick up the pizza ordered by Bob from Joe's Pizza Palace. The food delivery system provides the location of the requesting user to the driver so that the pizza can be delivered to Bob.

According to some examples, a service provider device (e.g., courier device) receives order information from the courier management system including at least a source identifier and an order identifier for the order. The courier device can enter into a beacon detection mode to detect a short range radio frequency beacon broadcasted by the source device. The source beacon includes the source identifier of the source and the order identifier corresponding to the order entry. Upon detecting the source beacon, the courier device compares the source identifier and/or the order identifier from the detected beacon to the source identifier and/or order identifier included in the order information received from the courier management system. If the source identifiers and/or the order identifiers match, the courier device reports to the courier management system that it is in proximity to the source device.

In some embodiments, the courier device may begin broadcasting its own beacon signal including a courier identifier and the order identifier (e.g., in a beacon broadcasting mode). The source device may then detect the courier beacon and match the courier identifier to a courier identifier from the order information received from the courier management system. If a match is detected, the source device sends data (e.g., data corresponding to a report) confirming the presence of the courier device in proximity to the source device to the courier management system. The courier management system may utilize the presence verification and timing of the received data to improved estimated completion or delivery times for requesting users, compensate couriers for waiting times, and/or improve pick up efficiency at source locations by obviating manual confirmation of a pick up by the courier.

DETAILED DESCRIPTION

The figures depict various embodiments for purposes of illustration only. One skilled in the art will readily recognize from the following discussion that alternative embodiments of the structures and methods illustrated herein may be employed without departing from the principles of the invention described herein.

Figure 1:
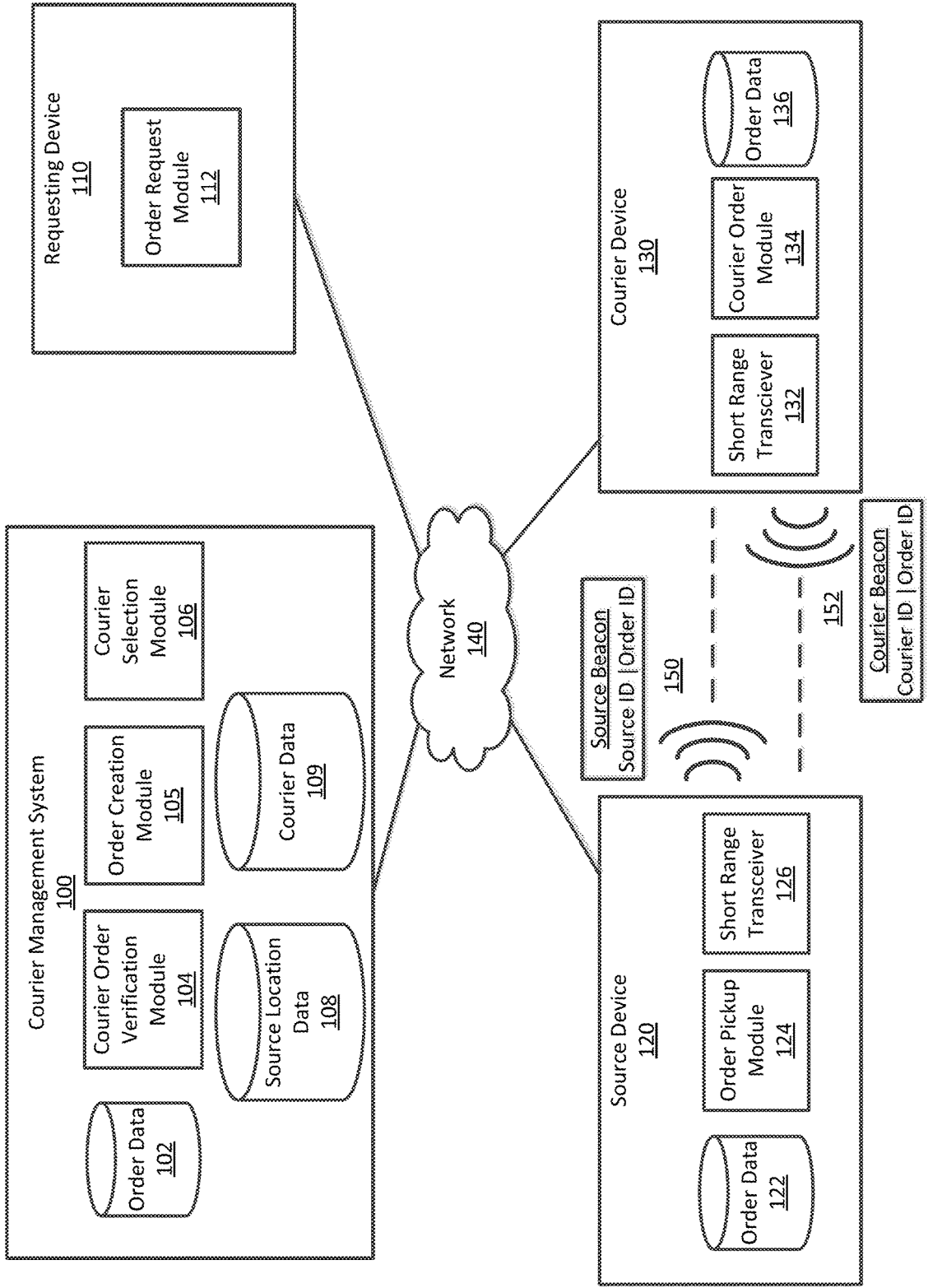
FIG. 1 shows an example environment for verifying courier proximity to an order pickup location, according to some embodiments.

FIG. 1 shows an example environment for verifying courier proximity to an order pickup location, according to some embodiments. In some embodiments, the environment for verifying courier proximity to an order pickup location may be implemented in the context of a courier management system 100 which coordinates the delivery of requested items between users of the courier management system 100, as explained in more detail below. However, one of skill in the art would be able to apply the proximity verification steps described herein to any system, which would benefit from verifying the proximity of two or more mobile devices to one another. According to this example implementation, there are three types of users of a courier management system 100: requesting users, source users, and courier users (e.g., service providers).

Users of the Courier Management System

A requesting user may request items available for ordering from the courier management system 100 using the requesting device 110. The courier management system 100 receives data corresponding to the requested items from the requesting device 110 and generates an order entry comprising the data (e.g., identifiers) of the requested items. Referring to the example above, requesting user, Bob, may select a pepperoni pizza from Joe's Pizza Palace. In this case, the requesting device 110 would send data corresponding to the selected pepperoni pizza from Joe's Pizza Palace to the courier management system 100. The courier management system would then create an order entry representing the requested pepperoni pizza.

Source users use source devices 120 to receive orders or order entries, and information associated with the order entries (e.g., which items, quantity, special requests, requested time, etc.), from the courier management system 100. Each source device 120 is registered with the courier management system 100 and each source device 120 is associated with a particular source location capable of providing particular items that are available to requesting users. The source data (e.g., source device and source location, as well as other source related information) can be stored in a database accessible by the courier management system 100. After receiving data for an order from the courier management system 100 via the source device 120, a source user may prepare the items requested in the order at the corresponding source location.

Referring to the previous example, Joe's Pizza Palace has a source device 120 for an employee (e.g., a source user) to use in order to interact with the courier management system 100. The source device 120 may receive the order for the pepperoni pizza from the courier management system 100 and may then display the order and any additional information associated with the order, such as identifying information of a courier that will be picking up the order. Employees at Joe's Pizza Palace may then prepare the order based on the displayed information on the source device.

Courier users can be assigned to pick up and deliver items for orders for requesting users and receive information associated with the orders from the courier management system 100 via the courier device 130 (e.g., such as information indicating the items that must be picked up and delivered to the requesting user, the locations for pick-up and delivery, the time to go to the pick-up location, etc.). In some embodiments, couriers may not be strictly couriers and may instead be service providers who may provide any number of different services (e.g., transport services).

Referring again to the previous example, the courier management system 100 may select a courier to deliver the pepperoni pizza from Joe's Pizza Palace to the location of the requesting user. The courier management system 100 may send the location of Joe's Pizza Palace, a list of items to be picked up and delivered, and a location of the requesting user the courier device 130 associated with the user so that the delivery can be made.

Role of the Courier Management System

The courier management system 100 may coordinate the interaction of these three types of users in order to enable items produced by source users at a source location to be delivered to requesting users in another location by coordinating courier users or service providers. In an example embodiment in which the courier management system 100 is a system for arranging the delivery of food orders, the requesting user can submit a request for a food item from a restaurant in the area, for example, by generating the request using inputs to select one or more items on a dedicated application on a requesting device 110. The courier management system 100, remote from both the restaurant and the requesting user, can create an order (e.g., a record or entry corresponding to the order) for the food item, store the record in a database (e.g., along with data associated with the requested item, the restaurant, the requesting user identifier, etc.), and send order information to a source device 130 located at the restaurant. The courier management system 100 can also select, from a pool of service providers, a service provider to provide the delivery service (e.g., pick up the order and deliver it to the requesting user) and transmit information about the order to a courier device 120 of the selected service provider or courier. In some examples, each source location is associated with a source device 130 with which to communicate with the courier management system 100 over one or more networks. The source user at the restaurant can prepare the food items corresponding to the order per the received order instructions and wait for the courier to pick up the food items upon its completion. The courier can confirm pick up of the food item and deliver, using navigation instructions, to the requesting device 110 or a delivery location specified by the requesting user to deliver the food item.

In addition to communicating with source users, courier users, and requesting users to arrange for the delivery of items from the source locations to the requesting users, according to some examples, the courier management system 100 coordinates the use of short range radio transmissions between the devices to verify the proximity, location, and/or movement of a courier device 130 (e.g., relative to a source device) and determine additional data, which may be used to improve estimated times of arrival, provide incentives for couriers, and/or improve courier adherence to instructions provided by the courier management system 100.

Requesting Device

The requesting device 110 provides an interface, via a client application for example, for an end user to request items made available by the courier management system 100 via an order request module 112. The requesting device 110 may be any suitable computing device that can display items available for request and a graphical user interface (GUI) for the end user to select those items (e.g., via an input mechanism, such as a touch sensitive display). The client application can receive data from the courier management system 100 about the various sources and/or items that a requesting user can order (e.g., based on a time, the delivery location or current location of the requesting user, and/or the source locations), and the request module 112 can generate and present (for example, in conjunction with a user interface module, not illustrated in FIG. 1 for purposes of simplicity) a user interface that includes a set of selectable features or graphic images representing sources (e.g., restaurants, stores, etc.) and/or a set of selectable features representing items that a requesting user can order. For example, the GUI may display icons representing a variety of food establishments and, upon receiving a user selection of one of the icons, the GUI may display various food items available at the selected establishment.

The request module 112 determines, via an input detected or received from the requesting user, data indicating one or more requested items and sends a set of identifiers of the requested items (and/or an identifier of the source that provides the requested items) to the courier management system 100 over one or more networks 140 as a request to the courier management system 100. The location of the requesting device 110 may be sent as part of the request to the courier management system 100 and may also be used as a delivery location for the order. Additionally or alternatively, the requesting user may also provide a delivery address.

Functions of the Courier Management System

The courier management system 100 receives requests for items from a requesting device 110 and coordinates preparation of the order by a source location, as well as pickup and delivery of the contents of the order by a courier operating the courier device 130. In one example, the courier management system 100 includes an order creation module 105, a courier selection module 106, and a courier order verification module 104. In addition, the courier management system 100 has one or more data stores, such as an order data store 102, a source location data store 108, and a courier data store 109, for example. The courier management system 100 may arrange courier services for many different types of orders depending on its configuration. Referring back to the pizza example, the source would be a restaurant and the order would specify the particular pizza from the menu of the restaurant which a courier would then retrieve and deliver. Another example is the delivery of items such as store-bought products by a user, or items that are to be delivered from one location to another, such as packages, court documents, etc. The courier management system 100 thus may include many additional components, which for purposes of simplicity are not illustrated in FIG. 1, that assist in the order process. For example, the courier management system 100 may also perform a selection of a specific courier for delivery of a particular order (e.g., based on the status of the courier and/or the location of the courier, the location of the restaurant or store, the location of the destination, etc.), and may provide payment, order selection, and other services for the users associated with the requesting device 110, the source device 120, and/or the courier device 130.

Upon receiving a request for one or more items from requesting device 110, the courier management system 100 creates an order entry corresponding the requested items using the order creation module 105. For example, the order creation module 105 can create and store an entry in the order data table or store 102. The order creation module 105 generates a unique order identifier for the new order (e.g., random string for the identifier) and lists the items (e.g., as identifiers or text) corresponding to the order along with a delivery location, which may be an address or GPS location provided in the request.

In one example, the order creation module 105 then selects a source and/or source location for the order. For systems where the source location for the requested items is included in the request, the order creation module 105 looks up the corresponding source identifier from the source location data store 108 and adds the source identifier to the order entry. As an addition or an alternative, in some examples, the request can include the source identifier along with the identifiers or names of the items. In such an example, the order creation module 105 can identify the source and the source location using the source identifier. In systems where the source location or source identifier is not included in the request, the order creation module 105 uses the source location data 108 to determine which source locations can provide the requested items.

After determining the source identifier for the order entry, the order creation module 105 provides request data including the source location and delivery location to the courier selection module 106 to cause the courier selection module 106 to select a courier associated with a courier device 130 to deliver the requested items from the source location to the delivery location. Depending on the embodiment, the courier selection module 106 may select a courier based on a number of factors, including the address or GPS location of the source location (e.g., the GPS location), the GPS location of requesting device or the specified delivery location, and the location of the courier device; the current location or route of the courier; the distance of the courier to the source location; and/or the estimated travel time from the location of the courier device to the source location and then to the location of the requesting device. The courier management system 100 monitors the above listed factors by periodically communicating with and/or receiving updates of the courier data to reflect changes in courier positions, routes, states, etc. In some embodiments, the courier selection module 106 may select a courier for the order entry and then send data corresponding to an invitation to provide the delivery service to the courier device 130. The courier may then choose to confirm or deny the invitation, e.g., by providing user input. If the invitation is denied, the courier selection module 106 selects a different courier to complete the order. If the invitation is accepted, the courier selection module 106 updates the order entry with the selected courier identifier and/or stores other information or associates the order entry with other information, such as the location of the courier when accepted, the route the courier is taking, etc. In addition, once the courier selection module 106 has successfully arranged a delivery for the order, information about the selected courier is provided to the requesting device 110 and/or the source device 120.

Accordingly, in some examples, the completed order entry includes a unique order identifier, a source identifier, a courier identifier, a requesting user identifier, a set of data corresponding to the requested item(s), and/or a delivery location. The order entry can also include or be associated with other information, such as time of request, time of order preparation completion, time of pick up, estimated time of arrival to delivery, route driven or taken by the courier, duration of time from pick up to delivery, etc. An order entry may also include an indication of the status of the order (e.g., whether the order is "being processed," "being prepared," "being picked-up," "en route," "delivered," etc.).

After the order creation module 105 creates the order entry for the requested items, the courier order verification module 104 sends data corresponding to the order entry (e.g., information or identifiers of the items requested by the user of the requesting device 110) to the source device 120 and/or the courier device 130, where it is stored in order data 122 and/or order data 136 respectively. Order data 122 and/or order data 136 may be synchronized (e.g., periodically and/or responsive to any changes to the order entries in the order data store 102) with the order entry stored at the order data store 102. The source devices 120 and courier devices 130 may maintain order entry data for "active orders." An active order may be any order that has been requested on the courier management system 100 that has not yet been delivered to the delivery location. In some embodiments, an order entry may remain stored in the order data store 102 after it has been delivered (e.g. to record feedback on the order in association with the order entry). In some embodiments, data associated with inactive orders are cleared from order data 122 and order data 136 on source devices 120 and/or courier devices 130. Each source device 120 and each courier device 130 may manage more than one active order at a particular time. When the status of an order changes the source devices 120 and courier devices 130 may be updated with the new status of the order. Additionally, the status of the order may cause changes in behavior of the source devices 120 and courier devices 130.

The source device 120 provides an interface (e.g., via a client application or web page on a browser) to an operator at the source location to interact with the courier management system 100, and broadcasts a beacon for the courier device 130. The source device 120 may be any suitable computing device, such as a desktop or laptop computer, a point-of-sale terminal with suitable features, a mobile device, a smartphone, a tablet computer, and so forth. In one example, the source device 120 can be a tablet device that is coupled to or communicates with the merchant's point-of-sale terminal, while in another example, the source device 120 can correspond to the point-of-sale terminal. The source device 120 includes order data 122, as well as an order pickup module 124. The order data 122 includes order entries for orders that can be provided at the source location corresponding to the source device. The source device 120 also includes a short range transceiver 126 for broadcasting and receiving beacons. The short range transceiver 126 transmits a source beacon 150 according to instructions from the order pickup module 124 and may receive or detect a courier beacon 152 from the courier device 130.

The short range transceiver 126 may take various forms according to different embodiments. In general, the short range transceiver 126 emits a low-power, low-range signal that may be detected by other nearby devices, such as, for example, the courier device 130. In one embodiment, the short range transceiver is a radio transceiver, and the source beacon 150 is transmitted via a Bluetooth broadcast or Bluetooth Low Energy (BLE) broadcast. In a particular embodiment, the beacon may be transmitted using Bluetooth technologies and/or protocols that provide received signal strength ranging and/or identification information, which identifies the broadcasting device, may be used. In an embodiment, the beacon broadcast includes a unique identifier associated with the broadcaster, and may specify a major and a minor value. The unique identifier (e.g., a UUID) can be associated with the courier management system 100 and may be common among all source and courier devices interacting with the courier management system 100. In this example, the major value represents the individual broadcasting device, such as the source device identifier or the courier device identifier, while the minor value is an identifier of the order. The courier order verification system 100 may provide these identifiers for an order to the source device 120 and the courier device 130. The minor value for broadcasting of the order may represent a hash value or other means of converting an order to a range of possible values for the broadcast. For example, the major and minor values each have a range between 0 and 65535, and the courier management system 100 determines near-unique values for an expected interaction between courier device 130 and source device 120. For example, the major value may be adjusted such that each source and courier device in a nearby location has a distinct major value.

A similar transceiver is also provided on the courier device 130 as a short range transceiver 132. The transceiver may also use different amounts of power when broadcasting compared to when transmitting. As discussed below, in one example, the transceiver on the courier device 130 may maintain operation as a receiver only (to detect a source beacon 150). Additionally, the courier device 130 may broadcast a courier beacon 152 to the source device 120 upon receiving a source beacon 150 from the source device 120.

When receiving or detecting a beacon, both the source device 120 and the courier device 130 may parse the broadcast beacon to identify the order identifier or the source or courier identifier (e.g., the major value and minor value). In addition, the transceiver of either the courier device 130 or the source device 120 (or in conjunction with other device resources of the courier device 130 or the source device 120) may determine the signal strength of the beacon, and use the received signal strength to an estimated proximity or distance of the sending device (e.g., converting the received signal strength). In some implementations, the estimated proximity is reported directly as a distance measurement. In other embodiments, the estimated proximity may be reported qualitatively as a proximity classification, for example, as "far," "near," or "immediate" to the receiving device. Additionally, proximity classification may correspond to a range of estimated distances depending on the implementation of the short range transceiver 126. For example, a proximity of 10 meters or more may be reported as "far", between 1 and 10 meters as "near", and within 1 meter as "immediate". Therefore, the received signal strength of the broadcast signal may be converted to an estimated distance before being assigned a proximity classification as a proximity estimate and reported to the courier management system.

The short range transceiver 126 may also be capable of transmitting a single beacon at any given time. The order pickup module 124 receives orders from the courier management system 100 and instructs the short range transceiver 126 in the broadcast and detection of beacons. When the order pickup module 124 receives an order from the courier management system 100, the order pickup module 124 may provide the new order on a user interface for display, for example, for an operator at the source to begin preparing the items in the order for pickup. The order pickup module 124 may also add the order to a data store of order data 122. In one example, the order data 122 maintains a list of currently active orders. As referred to herein, the active orders are the orders which have not been picked up by a courier, and which the source device 120 will broadcast for a courier device 130 to identify.

To identify the source device 120, the order pickup module 124 controls the short range transceiver 126 to broadcast active orders with a source beacon 150. In one example, the source beacon includes a source identifier and an order identifier. In such an implementation, these may correspond to the major and minor values of the beacon, respectively. The order pickup module 124 identifies the active orders in the order data 122 and broadcasts the active orders via the short range transceiver 126 to provide the source beacon 150 to devices that are near to the source device 120. When a device is near to the source device, such as the courier device 130 assigned to one of the active orders, the device may receive and detect the broadcast source beacon 150 and identify the values within the source beacon 150.

In addition, the transmission of a beacon may be limited to broadcasting a single message or identifier on the channel at once. In embodiments where the short range transceiver is limited to transmitting a single source beacon 150, the order pickup module 124 may modify the default behavior of the short range transceiver 126 to cycle the broadcast of active orders. That is, among the set of active orders, each active order may be broadcast for a limited amount of time and then another order from the set of active orders is selected for broadcast, until each of the active orders has been broadcast, and then the first order may be broadcast again. As active orders are added or removed to the list of active orders, the orders cycled by the order pickup module 124 for broadcast (and the associated beacons) may also change. In this way, a given source device 120 may broadcast a consistent source identifier (e.g., as a major value) and may modify the broadcast order identifier as the active orders are cycled. Each active order may be broadcast for a specified amount of time, such as one tenth of a second (or a complete second, or other specified time), or the amount of time for cycling the orders may vary, such as according to the number of active orders. For example, the entire set of active orders may be set to cycle within a specified amount of cycle time, such as thirty or sixty seconds. Each order may receive a proportional amount of that cycle time, for example when there are six active orders, each may be broadcast for ten seconds of a sixty-second cycle time. In this way, according to an example, the courier device 130 that receives any broadcast having an expected source identifier may wait for the predetermined full cycle time to verify whether the source device 120 is transmitting an active order desired by the courier device 130.

The order pickup module 124 may also monitor received courier beacons 152 from the short-range transceiver 126. When a courier beacon 152 is received, the order pickup module 124 identifies whether the received courier beacon 152 matches an active order of the source device 120 and identifies a match in the order data 122. When there is a match, the order pickup module 124 may send a notification to the courier management system 100 to indicate the receipt of a courier beacon 152 and verify the courier is nearby. In some embodiments, the order pickup module 124 sends updates to the courier management system 100 as the estimated proximity of the courier device changes. For example, when the proximity of a device matching an order changes to "near" from "far" or from "near" to "immediate." In some examples, the source device 120 does not send the event until the received courier beacon 152 that matches an active order is closer to the source device 120 than a threshold, for example by not notifying the courier management system 100 until the courier beacon is an estimated "near" proximity. After receiving the courier beacon 152 (or receiving it at a given estimated proximity), the source device 120 may remove the related order from the list of active orders. Alternatively, the source device 120 may report the received courier beacon 152 but maintain the order in its list of broadcast active orders until receiving a message from the courier management system 100 to stop broadcasting.

The courier device 130 also receives order data from the courier management system 100 and receives and/or broadcasts beacons to verify proximity of the source device 120 with the courier device 130. Like the source device 120, the courier device 130 can be any suitable computing system, such as a mobile device or smartphone. As with the source device 120, the courier device 130 receives and stores order data 136, and a courier order module 134 may receive and coordinate orders from the courier management system 100. The short range transceiver 132 is also capable of receiving the source beacon 150 and may also be used to broadcast a courier beacon 152.

When the courier device 130 has one or more active orders, the courier order module 134 instructs the short range transceiver 132 to listen for any source beacons 150 having a source identifier and order identifier associated with any active orders. In this example, the courier order module 134 may instruct the short range transceiver 132 to operate in a beacon detection mode to detect beacons, and does not broadcast a courier beacon 152 until an appropriate source beacon 150 for an active order is received. In this example, the courier order module 134 may reduce the power consumption of the short range transceiver by avoiding broadcast until the courier device 130 detects the relevant source device 120. As an addition or an alternative, in some embodiments, the courier order module 134 does not detect beacons using the short range transceiver 132 until other data (e.g., GPS data) indicates that the courier device 130 is close to the source device 120. For example, the location of the courier device 130 may be otherwise monitored, and the courier order module 134 may not activate the short range transceiver 132 to detect source beacons until the location of the courier device is within a threshold distance from the source location, or a geofence or other location area of the expected location of the source device 120. The location area and determination thereof may be performed by the courier management system 100 or may be performed by the courier device 130. In a particular embodiment, the courier device 130 is equipped with a GPS receiver and reports its GPS location to the courier management system 100. The courier management system 100 may then notify the courier device 130 that it is currently located within a geofence associated with a source corresponding to one of the active orders in the order date 136 of the courier device 130.

When the courier order module 134 receives a source beacon 150 matching order data 136, the courier order module 134 determines the received signal strength of the received source beacon and calculates a proximity estimate based on the received signal strength. The courier order module 134 reports the match to the courier management system 100 and optionally includes the calculated proximity estimate. As with the source device 120, the courier order module 134 may continuously detect (e.g., periodically sample at a predetermined rate) the source beacon 150 and recalculate the proximity estimate based on changes in the received signal strength of the beacon. If the proximity estimate changes between samples, the courier order module 134 may send an update of the estimated proximity of the source device 120 to the courier management system 100 as a beacon detection event. In some embodiments, a change in the proximity estimate is reported to the courier management system only when the proximity estimate changes from one proximity classification to another.

In addition, in one example, when the courier device 130 receives a beacon having a source identifier and/or an order identifier matching the order data 136, the courier device 130 may begin to broadcast a courier beacon 152 for the courier (e.g., as a confirmation of detecting the source beacon 150). The courier beacon 152 may include the courier identifier as well as the order identifier for receipt by the source device 120. The courier beacon 152 may be broadcasted when the source device 120 is identified, or may be broadcast when the estimated proximity of the source beacon is relatively closer to the courier device 130 (e.g., "near" or "immediate"). In this way, broadcast of the courier beacon 152 may be limited to circumstances when the source device 120 is expected to receive it and reduce the comparatively energy expensive broadcasting of the courier beacon 152. In one example, the source device 120 reports receipt of the courier beacon 152 to the courier management system 100.

In an alternative embodiment, the courier device 130 may broadcast the courier beacon 152 before detecting a source beacon 150 and the source device 120 can detect or receive the courier beacon 152. For example, the courier device 130 can be triggered to broadcast the courier beacon 152 in response to the courier device 130 and/or the courier management system 100 determining that the courier device 130 is within a predetermined distance of the location of the source device 120 or the source location. The courier device 130 and/or the courier management system 100 can periodically determine the current location of the courier device 130 using the location-based resource(s) of the courier device (e.g., a global positioning system (GPS) receiver, Wi-Fi transceiver, etc.) and compare it with the location of the source device 120 (or the address of the store, restaurant, venue, etc. where the source device 120 is located).

The various devices may also communicate with one another using a network 140, which may represent the public Internet, or another type of communication channel. In general, each device may connect to the network using various means, such as a wired or wireless connection (cellular, LAN, WAN, etc.). Though the source device 120 and courier device 130 may communicate via the network 140 to the courier management system 100, and potentially with each other, via the network 140, these systems typically are not configured to permit estimated proximity information as may be provided by the beacons as described herein.

As described above, the source device 120 may broadcast (e.g., based on the status of the order etc.) a beacon 150 including an identifier for the order and/or an identifier of the source device 120. By broadcasting a source beacon 150, the source device 120 enables courier devices 130 to determine their relative location to the source device 120. In some embodiments, the device that detects a beacon may report its proximity to the device broadcasting the beacon in discrete intervals. For example, a device may report that it is within 15 meters, 10 meters, and 5 meters. This may aid in the pickup and delivery process of satisfying an order from a requesting user and may provide, through an event reporting processes described below, useful positioning and performance data to the courier management system 100.

The source device 120 may broadcast a source beacon 150 for a particular order when the status of that order indicates that the requested items have not yet been obtained, by the courier, from the source location. For example, the source device 120 may be instructed to broadcast a source beacon 150 for a particular order when the status of that order indicates that the requested items of the order are "ready for pickup." In this manner, the source device 120 can be instructed to broadcast a source beacon 150 during any identified stage in the order delivery process. By selectively broadcasting the source beacon 150, the source device 120 may reduce the number of beacons being broadcasted at a given time while still providing location information to nearby courier devices 130 that have been designated to obtain requested items from the source location.

When a courier device 130 comes within range of the source device 120, the courier device 130 can detect the source beacon 150 and the identifier(s) included in the source beacon 150. The courier device 130 may then determine whether the order identifier included in the source beacon 150 matches an order identifier associated with any active orders of the courier (e.g., associated with the courier's account or the courier device 130). If the order identifier included in the source beacon matches any order identifiers associated with the courier device's active orders, the courier device 130 reports the event of detecting the source beacon 150 (e.g., transmits data about the event as a "beacon detection event") to the courier management system 100. In some embodiments, upon receiving the reported event, the courier management system 100 may change the status of the order or may record the timing of the event for later processing.

According to some examples, by having each device report receipt of specific beacons, the courier management system 100 can verify that the courier device 130 was actually in range of the source device 120 or vice versa (e.g., to prevent fraud or spoofing of the respective beacons). As an additional benefit, the courier device 130 may save energy by waiting to broadcast its courier beacon until after receiving or detecting the source beacon 150, as the energy cost of detecting beacons may be much lower than the cost of broadcasting a beacon. As the courier device 130 may typically be moving and less reliably connected to a power source, this conserves power on the courier device 130 until the broadcast is expected to be received by the appropriate source device 120 (e.g., until after the courier device 130 receives the desired source beacon 150 and is therefore in range of the source device 120).

The courier order verification module 104 receives data about beacon detection events (e.g., including time information and/or locations of the devices when the beacon detection event occurred) from the source device 120 and/or the courier device 130 and determines whether the courier device 130 and the source device 120 were proximate to one another. This data may be used, for example, to verify that the order was picked up by the correct courier, or that the courier picked the item up in a way that brought the two devices in near proximity to one another. As a further example, couriers may be required by a policy of the courier management system 100 to enter the premises of a building at the source location to retrieve the order. If the order is picked up (e.g., the respective user of the source device 120 and/or the courier device 130 provides input indicating pick up was completed), but the courier did not enter the source location (e.g., did not enter the building), the courier order verification module 104 may be able to determine that the courier did not follow the policy because no event was received indicating the devices were in proximity to one another. In some embodiments, the dimensions of the building at the source location as well as the location of the source device 120 within the building may be used along with the detection event to determine whether a courier entered a building. In another example, the beacon detection events can be used to determine how long the courier had to wait at the source location once he/she entered in order to receive the physical order from the source location and/or determine the delay by the source in preparing the order for pick up (e.g., based on an estimated time of preparation).

In some examples, the courier order verification module 104 provides the order information to each of the courier device 130 and source device 120. As discussed below, in some examples, the source device 120 may broadcast a source beacon 150 that is received by the courier device 130. The courier device 130 reports the receipt of the source beacon 150 via a beacon detection event. The courier device 130 may also broadcast a courier beacon 152, which when received by the source device 120, is reported in another beacon detection event. When the courier order verification module 104 receives data about the detection events, which may include an estimated distance between the courier device 130 and the source device 120, the courier order verification module 104 can determine that the two devices were actually proximate to one another and verify that the order was picked up. This may also permit the courier order verification module 104 to limit interactions on the source device 120 or on the courier device 130, for example, by obviating manual confirmation that an order was picked up by either the source user or the courier using the source device 120 or the courier device 130, respectively.

According to an example, the courier order verification module 104 sends the source identifier and/or courier identifier to the source device 120 and the courier device 130 for broadcasting the source beacon 150 and courier beacon 152, respectively. In some embodiments, the courier order verification module 104 may also instruct the source device 120 and the courier device 130 to start and/or stop broadcasting a beacon for the order. For example, when the courier device 130 broadcasts a courier beacon 152 in response to detecting the source beacon 150, the courier order verification module 104 may instruct the courier device 130 to stop broadcasting the courier beacon 152 when the courier management system 100 receives the associated beacon verification event from the source device 120. This can result in power savings on one or both devices.

In one variation, the courier order verification module 104 may also use data about detection events to determine how long a courier waits at the source location, and thus may be used to determine wait times of the courier, for example, to provide compensation to the courier for the delay, or to better estimate the delay of a pick up at the source location (e.g., based on an average of a plurality of wait times by a plurality of couriers at the source location). Additionally, the expected wait time at the source location may be used to automatically determine how long a courier is expected to wait and better predict and/or schedule the time of selecting a courier and/or the arrival of a courier at the destination of the order. The courier management system 100 may also provide mapping and navigation services, in which case the amount of time that a courier 130 is delayed at the order pickup location may be used to better predict courier routing, provide an estimated delay, and further improve courier routing, travel coordination, and other features provided by the courier management system 100. In this example, the length of time that couriers are at the source location may be determined by receiving events when the nearby beacons detected by the courier device 130 change, such that the courier device 130 reports when it exits the range of the source device 120. The wait time for one order may be stored with the wait times of other orders to determine the average wait, a distribution of wait times, and/or other characteristics of the wait times for a particular source for use in determining routing, travel estimates, and/or delivery times to the arrival as noted above.

Updates for the order may also be provided to the order request module 112 of the requesting device 110 associated with the order. For example, when an order is verified as picked up by the courier order verification module 104, the courier verification module 104 may provide a notification to the order request module 112 to update the user interface, e.g., via the client application, and indicate that the order has been picked up by the selected courier, and may update estimated travel and delivery times based on the average wait time of a courier at the source location, or may update the delivery time when the courier device 130 no longer receives (or receives at a lower strength) beacons broadcast by the source device 120.

Figure 2:
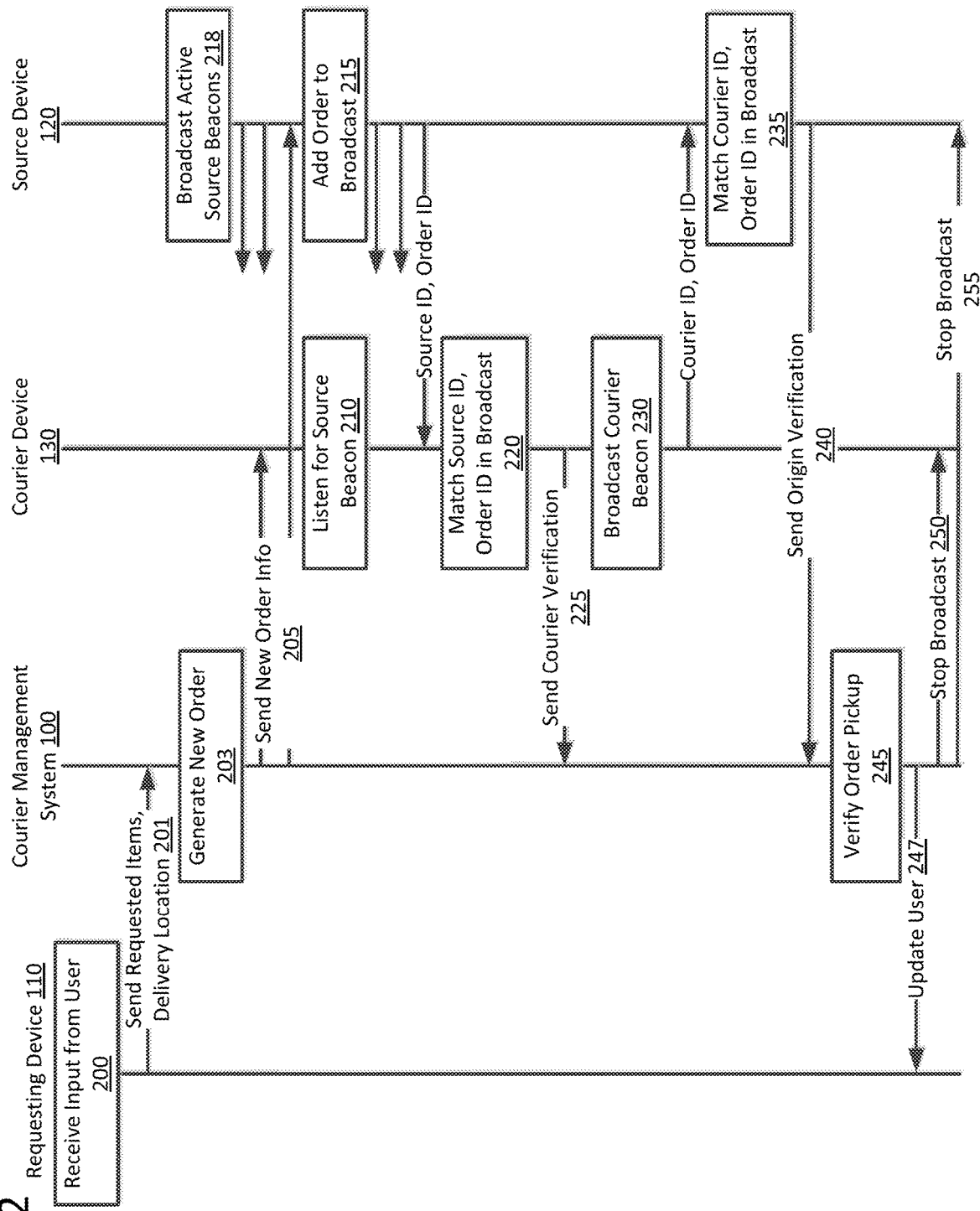
FIG. 2 shows example interactions between the courier management system, the source device, and the courier device, according to some embodiments.

FIG. 2 shows example interactions between the requesting device 110, the courier management system 100, the source device 120, and the courier device 130, according to some embodiments. The requesting device 110 may receive 200 input from the requesting user regarding requested items and, optionally, an input indicating a desired delivery location. The requesting device then sends 201 an order request including a list of requested items (e.g., a set of item identifiers) and a delivery location (e.g., a GPS location or address) to the courier management system 110. In some examples, the delivery location is reported automatically as the GPS location of the requesting device 110. The courier management system 100 generates 203 a new order entry in response to receiving the order request. To generate 203 the order entry, the courier management system 100 may satisfy the received order request by selecting a particular source location that can provide the requested item. In another example, the source location may be specified in by the order request. Upon selecting the source location and determining the corresponding source device 120 the courier management system 100 may select a courier with courier device 130 that is available to pick up the requested item. Upon selection of a source location and courier a new order is generated 203 at the courier management system 100, and the courier management system 100 sends 205 the new order information to the courier device 130 and the source device 120. The order information includes the identifiers associated with the order including the order identifier, the courier identifier, and/or the source identifier. Order information may be sent to the courier device 130 and the source device 120 over network 140. In embodiments where the courier immediately delivers the retrieved item to a requesting user, the order information may also include identifying information for the requesting user. The order information may also include additional details associated with the order such as the order instructions (e.g. order description, order instructions, a pick-up time for the order, etc.), courier descriptive information (e.g. a picture identifying the courier, the courier's name, courier vehicle, etc.), and pickup instructions for the courier (e.g. steps for picking up the order at the source location, parking regulations outside of the source location, etc.). Alternatively, these details may be retrieved from the courier management system 100 by either source device 120 and/or courier device 130 as needed using the order identifier, source identifier, or the courier identifier.

After receiving the order information including the order identifier and source identifier, courier device 130 may initiate a beacon detection mode 210 to listen for a source beacon 150 that includes an order identifier and a source identifier that matches the received order information stored in order data 136. Additionally, the source device 120 adds 215 the received order to the broadcast of the source device 120. The source device 120 broadcasts 218 source beacons 150 including the source identifier and the order identifiers corresponding to the active orders in order data 122. The broadcast source beacons thus may include the newly-received order, and may include broadcasting additional active orders and including the new order as one of the orders in a broadcast cycle of orders.

Initially, the courier device 130 is typically not within range of the source device 120 to receive a beacon (e.g., the courier operating the courier device 130 may be in a different geographic region and traveling to the merchant or location of the source device 120). As the courier approaches the source or merchant, the courier device 130 may detect or receive source beacons 150 that are broadcasted from the source device 120. The courier device 130 may then check the orders against active orders at the courier device 130 to determine whether there is a match. If the source identifier and the order identifier of a received beacon matches 220 an active order, the courier device 130 may send 225 a courier verification to the courier management system 100 to verify that the courier device 130 has come within range or has entered the vicinity (e.g., has come within a predetermined distance) of the source device 130. This verification may be sent as a beacon detection event by the courier device 130. In some embodiments, the process may end after this step, such that the courier verified its proximity to the source to the courier management system 100. In alternative examples, the courier device 130 may continue to monitor its proximity to the source device via the broadcast beacons from the source device, and report changes to the courier management system 100 as additional beacon detection events. By continuing to report the proximity of the courier device 130 to the source device, the courier management system 100 may update the estimated time of delivery for the order based on the amount of time spent waiting for pickup of the order or the time at which the courier device 130 reported leaving the proximity of the source device 120. If the courier device 130 continues to report its proximity until it leaves the range of the beacon, the proximity information may be used to determine how long the courier device 130 was near the source to pick up the order. This may reflect delays or other problems with the pickup or preparation by the source of the order, or to notify the courier management system 100 when the courier device 130 leaves the range or vicinity of the source device 130. In some embodiments, detecting a pick up delay based on the beacon detection events may cause the courier management system to notify the requesting user of a delay in the delivery of the requested items.

As an addition or an alternative, in some embodiments, the courier device 130 can also broadcast 230 its courier beacon 152 in response to sending 225 the courier verification. In this alternative embodiment, the courier device 130 may begin broadcasting 230 a courier beacon with the order identifier and the courier identifier corresponding to the order. Upon receiving the courier broadcast 152, the source device 120 identifies 235 a match between the courier and an active order, and sends a source verification 240 to the courier management system 100. The source verification may be a beacon detection event sent from the source device 120. When the courier management system 100 receives the courier verification, and optionally when it also receives the source verification, the courier management system 100 may automatically verify 245 that the order was picked up by the courier, as the devices reported proximity to one another for specifically designated broadcast parameters by the other device. In some embodiments, when the order is verified 245 as picked up, the courier management system 100 may indicate to the courier device 130 and source device 120 to stop broadcasting 250, 255. In some embodiments, the courier management system 100 instructs the courier device to stop broadcasting 250 prior to instructing the source device 120 to stop broadcasting 255. For example, though the proximity of the devices has been verified, the order may not in fact be ready to pick up, or there may be other problems with the courier device 130 leaving the source location. In this case, by allowing the source device 120 to continue to include the order in its broadcast, the courier device may continue to report the estimated proximity of the source device 120 to the courier management system 100. Thus, the courier management system 100 may delay a command to stop the broadcast of the source device 120 until after the courier device 130 reports a change in proximity of the courier device 130 from the source device 120 (e.g., from near to far). In other examples, the courier device 130 continues to report any change in proximity to the source device 120 by monitoring the "source identifier" of broadcast beacons, rather than the specific order. In that case, the actively-broadcasted orders on the source device may remove the verified 245 order, but events may still be received and provided by the courier device 130 representing the proximity of the courier device 130 to the source device 120.

By providing the receipt of a source beacon and matching source and order identifiers, the courier management system 100 can more effectively determine whether couriers are properly approaching the location of the source device to complete an order pick up. In addition, in embodiments where the courier device 130 broadcasts a courier beacon 152, because the courier device 130 and the source device 120 are providing dual confirmation of each other's proximity, the location of a beacon cannot be easily spoofed.

According to some examples, an entity that provides a platform for enabling delivery services and/or arranges courier services via the courier management system 100 can use the verification data to determine how long individual couriers are at an order provider's locale or venue (e.g., within a restaurant or a store, or a delivery location, etc.) generally or for each particular order. The entity can offer financial incentives, for example, to reduce dissatisfaction for couriers having to wait an extended amount of time for orders to be ready by the order provider or merchant. For example, a courier may be instructed to arrive at a restaurant to pick up a food order at noon. If the courier has arrived at 11:58 am and had to wait until 12:25 pm for the food order to be ready for delivery, the courier management system 100 can determine a financial incentive amount based on an extra duration of time that the courier had to wait (e.g., excluding a five-minute buffer from noon to 12:05 pm, the financial incentive amount can be based on the courier having to have waited for an extra twenty minutes).

Still further, in some examples, based on the data collected for individual order providers (e.g., from historically obtained verification data for orders in general and/or for specific items of orders), the courier management system 100 can predict when a received order for a particular order provider will be ready for pick up. By using the predicted estimated time of order completion, the courier management system 100 can time when a courier needs to be selected from a pool of available couriers and drivers to head to that order provider. As an additional example, the courier management system 100 can also use determined information about actual wait times or order completion time for an order provider to provide more accurate estimated time of arrival (ETA) information to requesters/consumers of the order.

The verification data can also be used to inform the entity whether a courier has followed particular instructions for picking up an order. As an example, for a particular restaurant, any food order pickups may require a courier using the platform to go inside the restaurant to pick up the food order (e.g., as opposed to asking someone at the restaurant to come to the courier's vehicle to hand off the food order). The courier can be instructed, via a client application running on the courier device 130, to go into the restaurant. The courier management system 100 can use proximity information determined from the beacons to determine whether a courier has complied with the instructions and provide feedback to the courier, e.g., via the client application, to modify or improve behavior (or provide positive feedback for following the instructions).

According to another example, by using beacons, the source device 120 can automatically detect whether a courier was present to pick up an order. An operator at the source and/or the courier may not have to press a button or a soft feature on a respective device to confirm that an order was picked up, thereby minimizing manual hand off and confirmation between the parties. In additional configurations, the received beacons may also be used to modify the interaction and display by each device. As one example, when a courier beacon is received by the source device 120, the source device 120 may retrieve a picture of the courier associated with the device to display the picture and order for delivery to the operator of the source device 120, permitting easy identification and hand-off to the courier and reducing the risk of improperly giving an order to an unauthorized user. This may also enable an operator at the source to make it easier to find the correct courier (if there are multiple couriers or a crowd of people at the venue). Alternatively, or additionally, upon detecting a source beacon 150 the courier device 130 may retrieve the contents of the order for pickup and instructions for picking up the order. This process allows the courier to verify whether they have received to correct order for pickup and whether they are satisfying the requirements of the venue operating the source device.

In another example, a similar beacon process may be performed during the delivery process, such that the courier may use beacons to identify proximity to the desired delivery location of the requesting device 110.

Figure 3A:
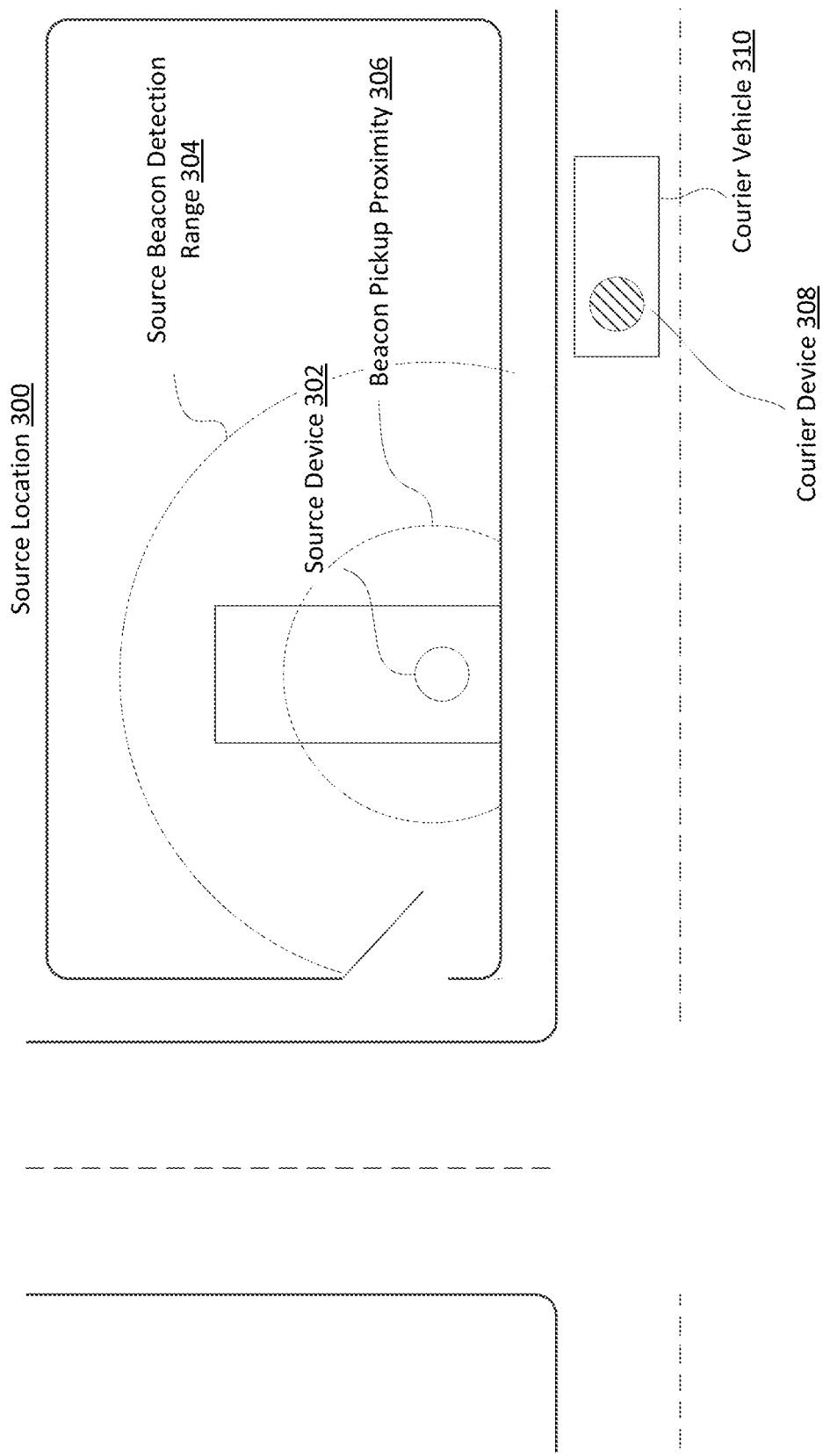
FIGS. 3A, 3B, 3C, 3D and 3E are graphical illustrations of the beacon broadcasting steps performed by a source device and a courier device in order to verify the proximity of the courier to the source location, according to some embodiments.

FIG. 3A illustrates a courier with a courier device approaching a source location in accordance with some embodiments. FIG. 3A illustrates a bird's eye view of a building of the source location 300 and the surrounding streets. Within the source location 300, the source device 302 is located on a counter top. As previously described, the source device 302 is broadcasting a source beacon 150. FIG. 3A illustrates the beacon signal as having a source beacon detection range 304 and a beacon pickup proximity 306. In this example illustration, the source beacon detection range 304 is the range at which a courier device 308 is able to detect the source beacon 150 and the beacon pickup proximity 306 indicates the proximity to which the courier device 308 must be in order to be confirmed as having picked-up the requested items of an order. In FIG. 3A, the courier device 308 is located outside of the source beacon detection range 304 and is travelling in a courier vehicle 310, which may be any kind of vehicle.

Because the courier device 308 is located outside of the source beacon detection range 304, the courier device 308 cannot detect the source beacon and so does not transmit a beacon detection event to the courier management system 100.

Figure 3B:
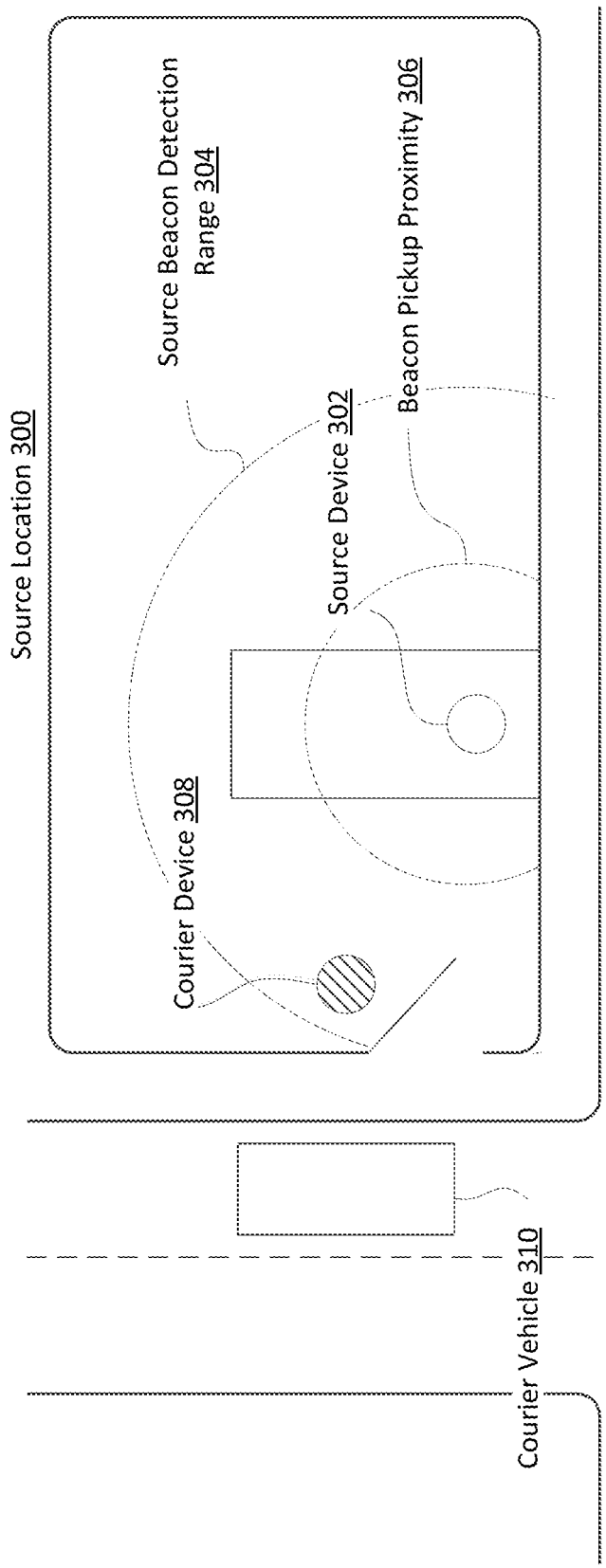

FIG. 3B illustrates a situation where the courier device 308 has moved inside the source beacon detection range 304 in accordance with one embodiment. In this case, the courier has parked the courier vehicle 310 outside the source location 300 and has moved inside the source location 300 with the courier device 308. The courier device 308 is now within the source beacon detection range 304. Thus, the courier device 308 can detect the source beacon 150 and proceed to match 220 the source identifier and order identifier included in the source beacon 150. If a match is detected, the courier device 308 would then transmit a beacon detection event to the courier management system 100 indicating that the courier device 308 is within the source location 300. The beacon detection event may also include an estimate of the proximity of the source device 302 to the courier device 308.

Figure 3C:
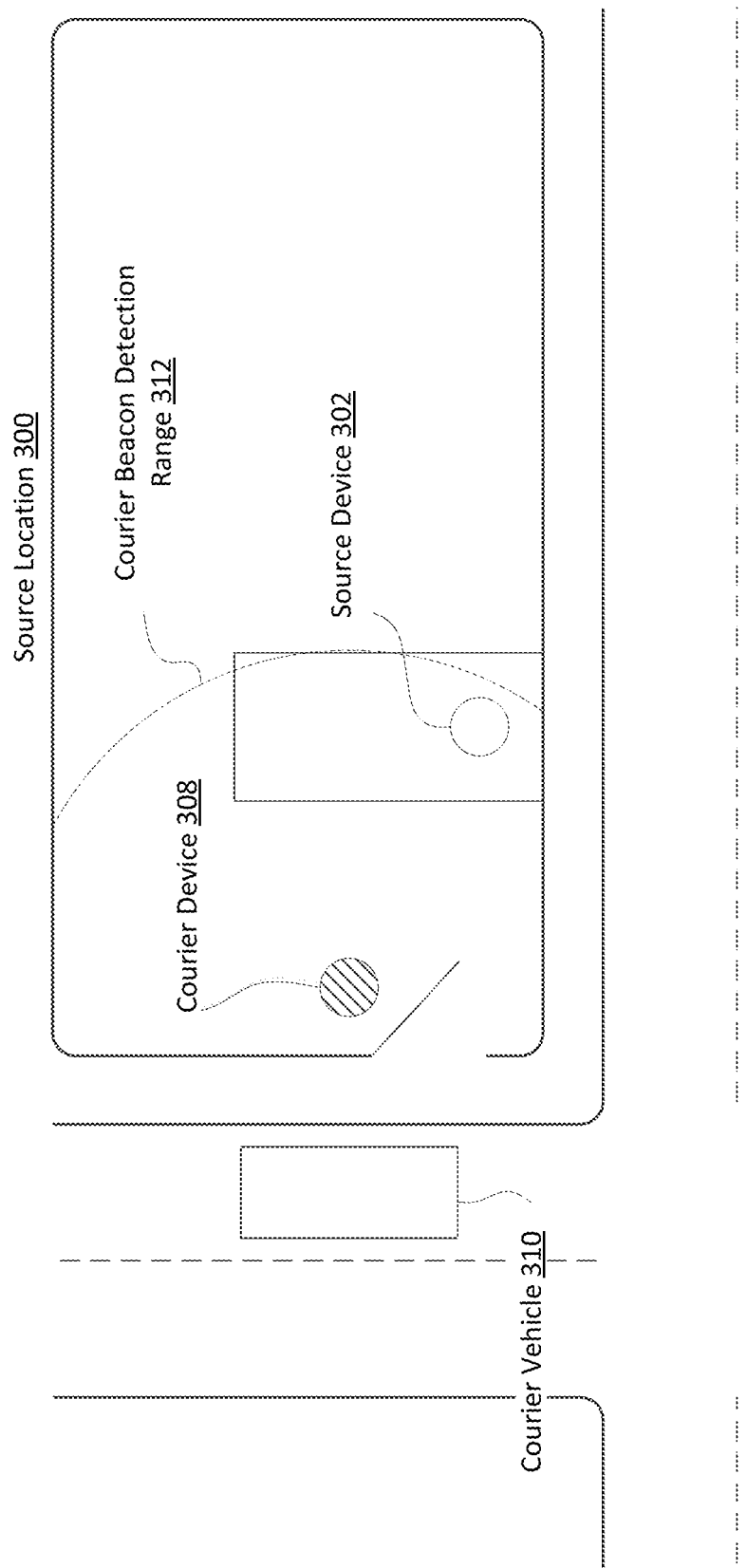

FIG. 3C illustrates the courier device 308 broadcasting a courier beacon 152 in accordance with one embodiment. In some embodiments, the courier device 308 may verify its position by broadcasting a courier beacon 152 in response to detecting a source beacon 150. Because the courier device 308 is already within courier beacon detection range 312, the source device 302 may detect the courier beacon 152 and transmit a second beacon detection event to the courier management system 100.

Figure 3D:
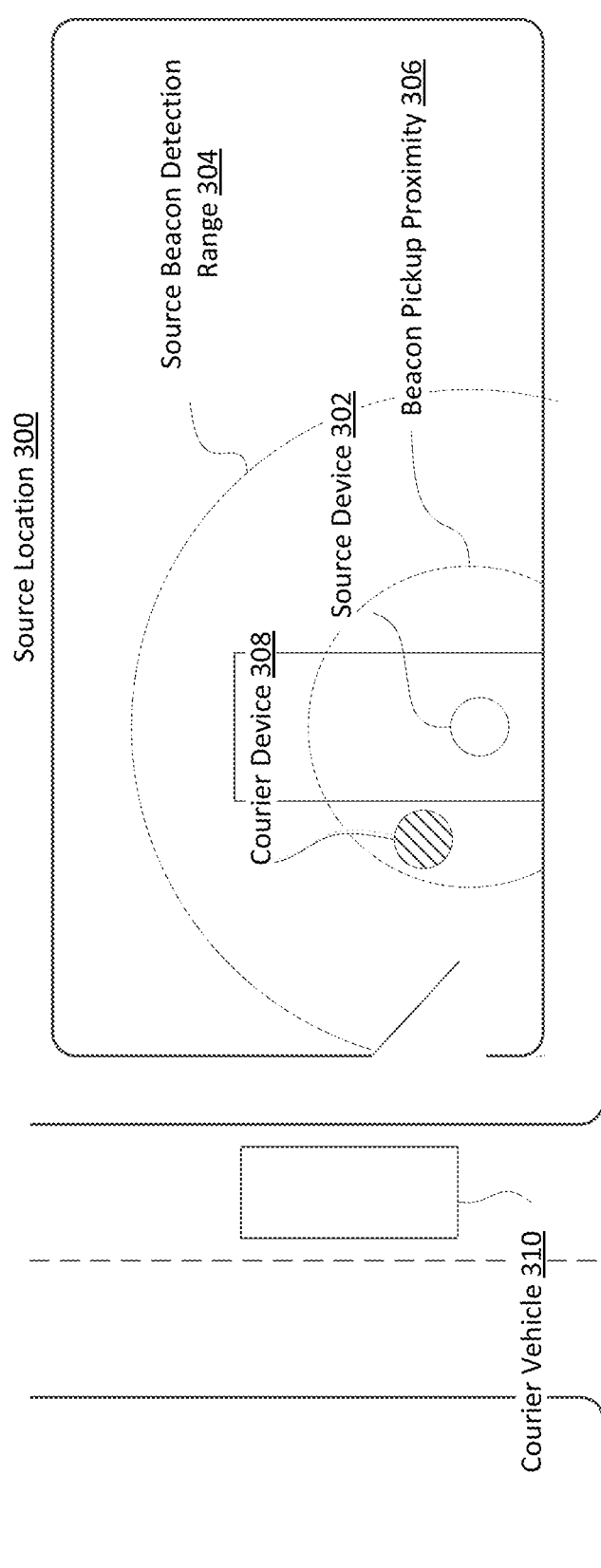

FIG. 3D illustrates the courier device 308 coming in close proximity to the source device 302 so that the courier may pick up the request items in an order in accordance with one embodiment. In order to pick up the order at the source location 300 the courier and courier device 308 must move within a threshold distance (e.g., the beacon pickup proximity 306). In some embodiments, the courier device 308 (or alternatively the source device 308 if the courier device 308 is still broadcasting the courier beacon 152) may continue to detect the source beacon 150 and estimate the distance between the two devices. Once the distance is less than the beacon pickup proximity 306, the courier device 308 may transmit a beacon detection event to the content management system 100 indicating that the two devices are close together. In some embodiments, the courier management system 100 will automatically indicate that the pickup has been completed as a result of receiving this beacon detection event as described in previous sections.

Figure 3E:
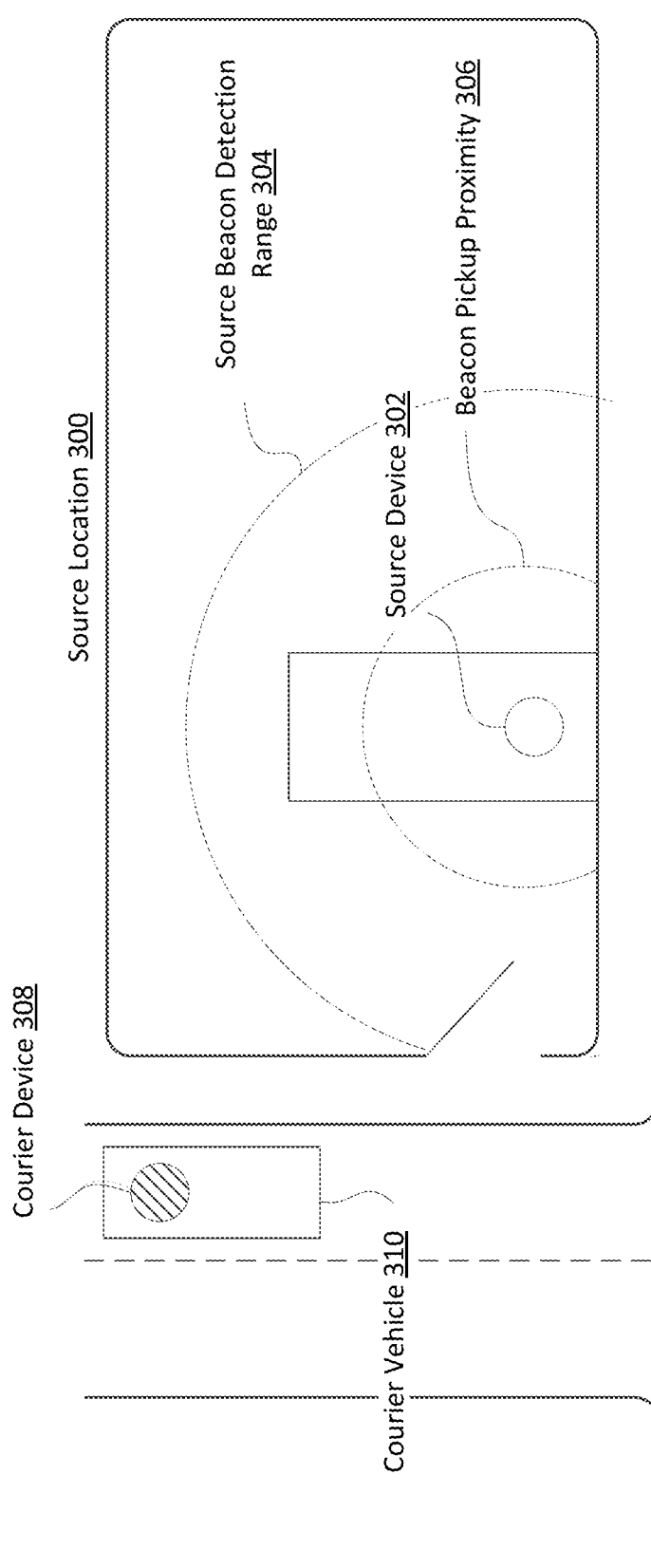

FIG. 3E illustrates the courier device 308 leaving the source location 300 in accordance with one embodiment. After pickup has been completed, the courier and courier device 308 leave the source location 300 and therefore the source beacon detection range 304. In some embodiments, the courier device 308 may determine that that the source beacon 150 is no longer being detected and may transmit a beacon detection event to the courier management system 100 confirming that the courier device 308 has left the source location 300. In some embodiments, this beacon detection event is used to determine estimated delivery times, or to confirm pickup of an order.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing location verification for a network system, the method performed by a computing device and comprising:
   receiving, from the network system over one or more networks, data including at least an order identifier and a source device identifier;
   detecting, using a short range transceiver of the computing device, a source beacon signal from a source device, the source beacon signal including at least a major identifier and a minor identifier;
   comparing the major identifier to the source device identifier and the minor identifier to the order identifier; and
   responsive to the comparison indicating that the major identifier matches the source device identifier and the minor identifier matches the order identifier:
     transmitting data indicative of a match to the network system over the one or more networks; and
     broadcasting, by the computing device, a computing device beacon signal, the computing device beacon signal including at least a computing device identifier and the order identifier.

2. The computer-implemented method of claim 1, wherein transmitting data indicative of a match to the network system further comprises:
   determining a received signal strength of the source beacon signal;
   calculating a proximity estimate based on the received signal strength, wherein the proximity estimate is an estimate of a distance between the computing device and the source device; and
   transmitting the data indicative of the match and data corresponding to the calculated proximity estimate to the network system.

3. The computer-implemented method of claim 2, wherein transmitting data indicative of the match and data corresponding to the calculated proximity estimate further comprises:
   classifying the proximity estimate based on an estimated distance of the proximity estimate; and
   transmitting the data indicative of the match and data corresponding to the classification of the proximity estimate to the network system.

4. The computer-implemented method of claim 2, further comprising:
   periodically sampling the source beacon signal;
   determining a received signal strength of a new sample of the source beacon signal;
     calculating a new proximity estimate based on the received signal strength of the new sample of the source beacon signal; and
   transmitting data corresponding to the new proximity estimate to the network system.

5. The computer-implemented method of claim 4, wherein transmitting data corresponding to the new proximity estimate further comprises:
   classifying a first proximity estimate of a first sample of the source beacon signal based on a first estimated distance of the first proximity estimate;
   classifying a second proximity estimate of a second sample of the source beacon signal based on a second estimated distance of the second proximity estimate;
   determining whether the first classification is different from the second classification; and
   responsive to determining that the first classification is different from the second classification, transmitting data corresponding to a change of classification to the network system.

6. The computer-implemented method of claim 1, further comprising:
   receiving a notification, from the network system, indicating that the source device verified the match; and
   responsive to receiving the notification, ceasing the broadcasting of the computing device signal.

7. The computer-implemented method of claim 1, further comprising:
   responsive to detecting the source beacon signal, retrieving, by the computing device, instructions for display by the computing device.

8. A non-transitory computer-readable storage medium storing computer-executable instructions that, in response to executing, cause a computing device comprising a processor to perform operations, comprising:
   receiving, from the network system over one or more networks, data including at least an order identifier and a source device identifier;
   detecting, using a short range transceiver of the computing device, a source beacon signal from a source device, the source beacon signal including at least a major identifier and a minor identifier;
   comparing the major identifier to the source device identifier and the minor identifier to the order identifier; and responsive to the comparison indicating that the major identifier matches the source device identifier and the minor identifier matches the order identifier:
  transmitting data indicative of a match to the network system over the one or more networks; and
  broadcasting, by the computing device, a computing device beacon signal, the computing device beacon signal including at least a computing device identifier and the order identifier.

9. The non-transitory computer-readable storage medium of claim 8, wherein transmitting data indicative of a match to the network system further comprises:
  determining a received signal strength of the source beacon signal;
  calculating a proximity estimate based on the received signal strength, wherein the proximity estimate is an estimate of a distance between the computing device and the source device; and
  transmitting the data indicative of the match and data corresponding to the calculated proximity estimate to the network system.

10. The non-transitory computer-readable storage medium of claim 9, wherein transmitting data indicative of the match and data corresponding to the calculated proximity estimate further comprises:
  classifying the proximity estimate based on an estimated distance of the proximity estimate; and
  transmitting the data indicative of the match and data corresponding to the classification of the proximity estimate to the network system.

11. The non-transitory computer-readable storage medium of claim 9, further comprising:
  periodically sampling the source beacon signal;
  determining a received signal strength of a new sample of the source beacon signal;
  calculating a new proximity estimate based on the received signal strength of the new sample of the source beacon signal; and
  transmitting data corresponding to the new proximity estimate to the network system.

12. The non-transitory computer-readable storage medium of claim 11, wherein transmitting data corresponding to the new proximity estimate further comprises:
  classifying a first proximity estimate of a first sample of the source beacon signal based on a first estimated distance of the first proximity estimate;
  classifying a second proximity estimate of a second sample of the source beacon signal based on a second estimated distance of the second proximity estimate;
  determining whether the first classification is different from the second classification; and
  responsive to determining that the first classification is different from the second classification, transmitting data corresponding to a change of classification to the network system.

13. The non-transitory computer-readable storage medium of claim 8, further comprising:
  receiving a notification, from the network system, indicating that the source device verified the match; and
  responsive to receiving the notification, ceasing the broadcasting of the computing device signal.

14. The non-transitory computer-readable storage medium of claim 8, further comprising:
  responsive to detecting the source beacon signal, retrieving, by the computing device, instructions for display by the computing device.

15. A computer system comprising:
  one or more computer processors for executing computer program instructions; and
  a non-transitory computer-readable storage medium storing instructions executable by the one or more computer processors to perform steps comprising:
    receiving, at a computing device from a network system over one or more networks, data including at least an order identifier and a source device identifier;
    detecting, using a short range transceiver of the computing device, a source beacon signal from a source device, the source beacon signal including at least a major identifier and a minor identifier;
    comparing the major identifier to the source device identifier and the minor identifier to the order identifier; and
    responsive to the comparison indicating that the major identifier matches the source device identifier and the minor identifier matches the order identifier:
      transmitting data indicative of a match to the network system over the one or more networks; and
      broadcasting, by the computing device, a computing device beacon signal, the computing device beacon signal including at least a computing device identifier and the order identifier.

16. The computer system of claim 15, wherein transmitting data indicative of a match to the network system further comprises:
  determining a received signal strength of the source beacon signal;
  calculating a proximity estimate based on the received signal strength, wherein the proximity estimate is an estimate of a distance between the computing device and the source device; and
  transmitting the data indicative of the match and data corresponding to the calculated proximity estimate to the network system.

17. The computer system of claim 16, wherein transmitting data indicative of the match and data corresponding to the calculated proximity estimate further comprises:
  classifying the proximity estimate based on an estimated distance of the proximity estimate; and
  transmitting the data indicative of the match and data corresponding to the classification of the proximity estimate to the network system.

18. The computer system of claim 16, further comprising:
  periodically sampling the source beacon signal;
  determining a received signal strength of a new sample of the source beacon signal;
  calculating a new proximity estimate based on the received signal strength of the new sample of the source beacon signal; and
  transmitting data corresponding to the new proximity estimate to the network system.

19. The computer system of claim 18, wherein transmitting data corresponding to the new proximity estimate further comprises:
  classifying a first proximity estimate of a first sample of the source beacon signal based on a first estimated distance of the first proximity estimate;
  classifying a second proximity estimate of a second sample of the source beacon signal based on a second estimated distance of the second proximity estimate;
  determining whether the first classification is different from the second classification; and responsive to determining that the first classification is different from the second classification, transmitting data corresponding to a change of classification to the network system.

20. The computer system of claim 15, further comprising:
receiving a notification, from the network system, indicating that the source device verified the match; and
responsive to receiving the notification, ceasing the broadcasting of the computing device signal.

* * * * *